United States Patent
Hoang et al.

(10) Patent No.: US 10,233,721 B2
(45) Date of Patent: Mar. 19, 2019

(54) VALVE INSERT SYSTEM

(71) Applicant: Cameron International Corporation, Houston, TX (US)

(72) Inventors: Loc Hoang, Houston, TX (US); Jia Li, Cypress, TX (US)

(73) Assignee: Cameron International Corporation, Houston, TX (US)

( * ) Notice: Subject to any disclaimer, the term of this patent is extended or adjusted under 35 U.S.C. 154(b) by 359 days.

(21) Appl. No.: 14/925,624

(22) Filed: Oct. 28, 2015

(65) Prior Publication Data

US 2016/0123109 A1    May 5, 2016

Related U.S. Application Data

(60) Provisional application No. 62/073,739, filed on Oct. 31, 2014.

(51) Int. Cl.

| | | |
|---|---|---|
| *E21B 34/02* | (2006.01) | |
| *F16K 25/04* | (2006.01) | |
| *F16K 1/02* | (2006.01) | |
| *F16K 31/50* | (2006.01) | |
| *E21B 43/12* | (2006.01) | |
| *F16K 99/00* | (2006.01) | |
| *F16K 3/316* | (2006.01) | |
| *F16K 3/36* | (2006.01) | |
| *F16K 27/04* | (2006.01) | |

(52) U.S. Cl.
CPC ............ *E21B 34/02* (2013.01); *E21B 43/126* (2013.01); *F16K 1/02* (2013.01); *F16K 3/316* (2013.01); *F16K 3/36* (2013.01); *F16K 25/04* (2013.01); *F16K 27/044* (2013.01); *F16K 31/50* (2013.01); *F16K 99/00* (2013.01)

(58) Field of Classification Search
CPC ... F15K 1/02; F16K 3/316; F16K 3/36; F16K 25/04; F16K 27/044; F16K 31/50; F16K 99/00; E21B 34/02; E21B 43/26
USPC ...................................................... 166/90.1
See application file for complete search history.

(56) References Cited

U.S. PATENT DOCUMENTS

| | | | |
|---|---|---|---|
| 3,269,692 A | * | 8/1966 | Shafer ................... F16K 5/0673 251/172 |
| 3,696,831 A | | 10/1972 | Fowler et al. |
| 4,281,819 A | * | 8/1981 | Linder ................... F16K 3/316 251/282 |
| 4,771,805 A | | 9/1988 | Maa |

FOREIGN PATENT DOCUMENTS

| | | |
|---|---|---|
| DE | 3222385 A1 | 12/1983 |
| GB | 2100843 A | 1/1983 |

OTHER PUBLICATIONS

PCT International Search Report and Written Opinion; Application No. PCT/US2015/058008; dated Feb. 9, 2016; 13 pages.

* cited by examiner

*Primary Examiner* — Matthew R Buck
*Assistant Examiner* — Patrick F Lambe
(74) *Attorney, Agent, or Firm* — Fletcher Yoder, P.C.

(57) ABSTRACT

A system including a valve, including a valve body having an interior volume and a bore along a first axis, a stem extending along a second axis, and a flow control element coupled to the stem, wherein the stem is configured to selectively move the flow control element through the interior volume between a closed position and an open position relative to the bore, and a valve insert system configured reduce a size of the interior volume and to guide a lubricant to reduce wear on the flow control element.

20 Claims, 5 Drawing Sheets

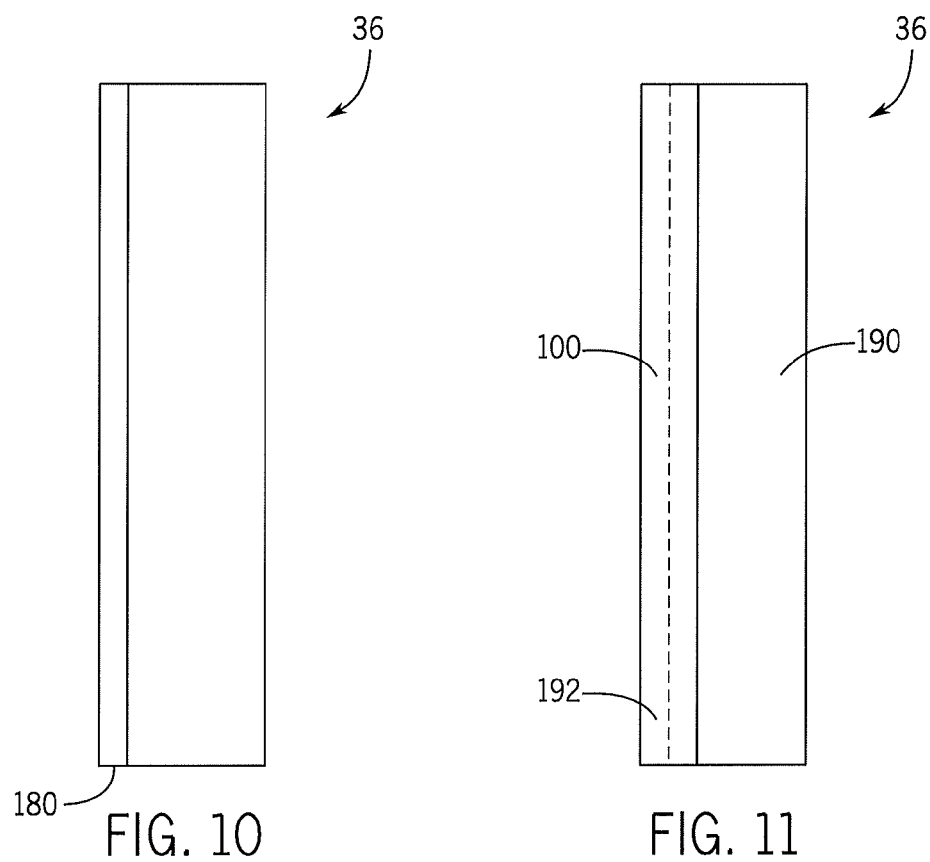

VALVE INSERT SYSTEM

CROSS-REFERENCE TO RELATED APPLICATION

This application claims the benefit of U.S. Provisional Patent Application No. 62/073,739, filed Oct. 31, 2014, entitled "VALVE INSERT SYSTEM," which is incorporated by reference herein in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Valves are used in a variety of applications to manage and transmit flows of materials. Valves generally can be placed in an open position that enables fluid flow through a primary flow path and a closed position that reduces or completely shuts off that flow path. However, when transporting a proppant containing fluid (e.g., frac fluid), proppant may enter crevices or affect interfaces of the valve, causing undesirable wear and/or a reduction in the useful life of the valve.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 10 is a side view of an embodiment of a valve insert with a coating; and FIG. 11 is a side view of an embodiment of a valve insert.

DETAILED DESCRIPTION OF SPECIFIC EMBODIMENTS

Figure 1:
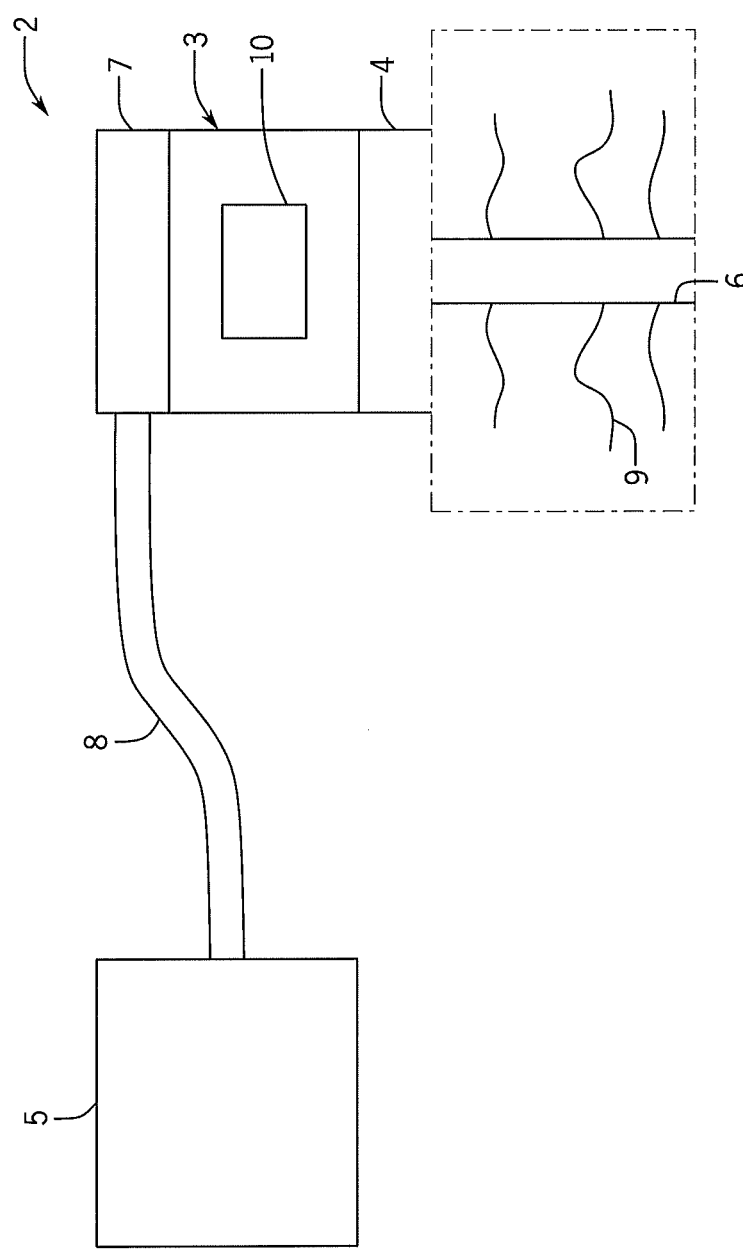
FIG. 1 is a schematic view of a frac system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Fracing is a relatively modern technique that enhances hydrocarbon production. Fracing generally entails the injection of a proppant or frac fluid into the wellbore to fracture the formation and, in turn, increase the formation's yield. Typically, the proppant is injected into the wellbore via a frac tree that is mounted on the wellhead. The wellhead, along with the frac tree, provides access to the formation via a wellbore. Specifically, frac fluid from a frac fluid supply is routed to a goat head mounted to the frac tree. The frac tree has a series of valves, some of which may be gate valves, to control to ingress of frac fluid into the wellhead and, in turn, into the wellbore.

These gate valves include a flow control element that transitions between open and closed positions to enable or block fluid flow (e.g., frac fluid). For example, the gate valve may control the flow of a proppant laden fluid (e.g., frac fluid), corrosive fluid, etc. When controlling the flow of proppant laden fluid, the proppant (e.g., sand, ceramic, etc.) may enter an interior volume of the gate valve, as well as interfaces between the flow control element and valve seats. To mitigate the negative impacts of proppant in the volume, for example, a lubricant can be injected into the volume. However, it can be time consuming and resource intensive to inject and replace the lubricant in the entire volume.

The disclosed embodiments include a gate valve with a valve insert system that guides and focuses lubricant flow to remove proppant from the interior volume and from interfaces between gate valve components. The valve insert system may also reduce the use of lubricant in the gate valve by reducing the size of the interior volume that receives lubricant. A smaller interior volume may also reduce the time required to replace old lubricant with new lubricant. For example, gate valve maintenance between frac jobs may involve replacing old lubricant with new lubricant. As a result, by reducing the size of the interior volume and focusing lubricant flow into interfaces between gate valve components, the valve insert system may reduce the amount of lubricant used, the amount of time needed to service the gate valve and increase its operating life. In addition, the inserts can direct the lubricant to the areas of the valve that benefit the most from the lubricant.

FIG. 1 is a schematic diagram of an embodiment of a frac system 2. In operation, the frac system 2 enables well completion operations to increase the release of oil and gas in rock formations. The frac system 2 includes a frac tree 3 coupled to a wellhead 4 that enables frac fluid to flow from a fluid supply 5 into a well 6. More specifically, the fluid supply 5 may couple to a frac head 7 (e.g., goat head style, inlet style) on the frac tree 2 with a conduit 8. In operation, the frac system 2 pumps a fluid (e.g., proppant containing fluid or frac fluid) into the well 6 to create and propagate cracks 9 in the rock formation to increase the release oil and gas from the well 6. In order to control the flow of frac fluid into the well 6, the frac tree may include a gate valve 10. The gate valve 10 may be used in an on/off manner to allow/block flow or to regulate (e.g., choke) flow through the frac tree 3.

Figure 2:
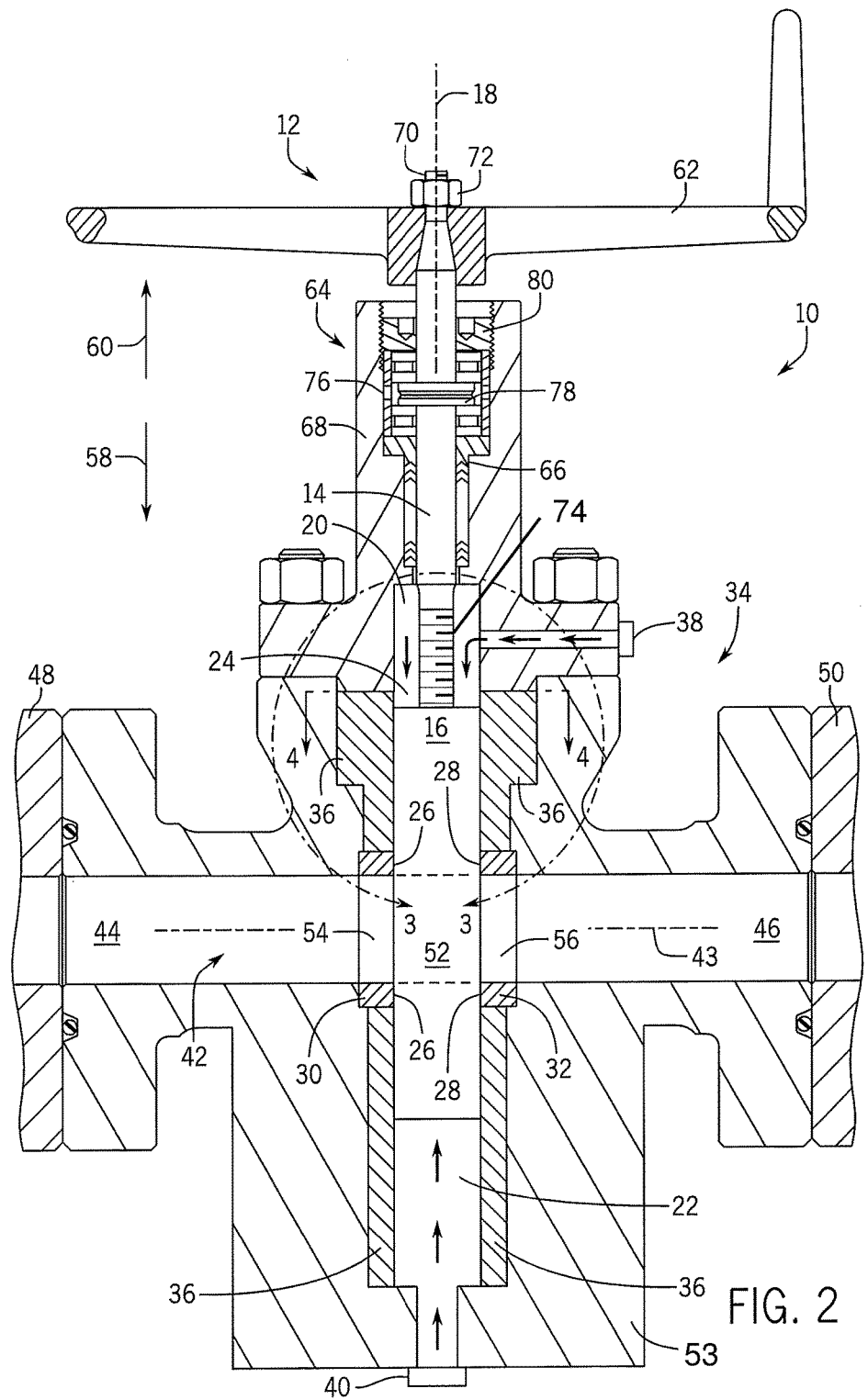
FIG. 2 is a partial cross-sectional side view of an embodiment of a gate valve in an open position.

FIG. 2 is a cross-sectional view of a gate valve 10 in an open position. As illustrated, the gate valve 10 includes an actuator assembly 12 that moves a valve stem 14 coupled to a flow control element 16. As the actuator drives the valve stem 14 along a central axis 18, the gate valve 10 opens and closes. In a closed position, the gate valve 10 blocks the flow of a fluid (e.g., proppant containing fluid) with a fluid tight seal, while the open position enables the fluid to flow freely through the gate valve 10. Unfortunately, during operation, proppant in a proppant laden fluid may enter first and second chambers 20 and 22 (e.g., annular, square, rectangular chambers) of a gate valve interior volume 24, and enter interfaces 26 and 28 between the flow element 16 and upstream and downstream seats 30 and 32 (e.g., annular metal seats). This can wear the seats and clog the interface, making it difficult to move the control element. However, the gate valve 10 may include a valve insert system 34 that facilitates removal of proppant and therefore reduces wear on the flow control element 16 and on the valve seats 30, 32. The valve insert system may include one or more inserts 36 (e.g., 1, 2, 3, 4, or more) that rest within the interior volume 24. For example, one or more inserts 36 (e.g., lubricant distribution manifolds, lubricant flow baffles) may rest within the first and/or second chambers 20, 22 to focus lubricant flow, which blocks proppant from entering and/or purges proppant from the interfaces 26, 28. In some embodiments, the inserts 36 may include grooves and/or coatings that facilitate flow and or concentrate lubricant flow to desired locations in the interfaces 26, 28. In operation, lubricant may be pumped into the first and second chambers 20 and 22 through respective lubrication supply ports 38 and 40. As the lubricant enters the first and second chambers 20 and 22, the lubricant flows through one or more grooves (e.g., axial grooves, radial grooves, circumferential grooves, or any combination therefore) in the inserts 36. The inserts 36 then channel the lubricant to the respective interfaces 26, 28 where the lubricant lubricates the interfaces 26, 28 while simultaneously driving proppant into a passage 42 along axis 43. In addition to blocking and removing proppant, the valve insert system 34 may reduce the amount of lubricant within the interior volume 24 by taking up space, decreasing the cost of valve maintenance (e.g., lubricant replacement between frac jobs).

As illustrated, the gate valve 10 includes an inlet passage 44 and an outlet passage 46 that fluidly couple to the interior volume 24 to form the passage 42. In operation, fluid (e.g., proppant containing fluid) may flow through frac system 2 from the upstream component 48 (e.g., pipe) to a downstream component 50 (e.g., pipe) which transports the fluid into a well during fracing operations. In such an embodiment, the gate valve 10 may be used in an on/off manner to allow or block flow from the upstream component 48 through the gate valve 10 and into the downstream component 50. In other embodiments, the gate valve 10 may be used to regulate (e.g., choke) flow from the upstream component 48 to the downstream component 50.

As explained above, the gate valve 10 includes a valve stem 14 (e.g., an elongated rod) that couples to the flow control element 16. For example, the valve stem 14 may couple to the flow control element 16 via threading. However, in other embodiments, the flow control element 16 may attach to the valve stem 14 using other connection joints, such as T-slots, pins, lift nuts, bolts, clamps, welds, and so forth. As illustrated, the flow control element 16 (e.g., gate or slab) includes a port 52 that selectively allows a fluid through a valve body 53, when the flow control element 16 is in an open position. In FIG. 2, the flow control element 16 is in an open position, so the port 52 generally aligns with openings 54 and 56 within the inlet seat 30 and the outlet seat 32, respectively, to open a passage 42. By moving the flow control element 16 axially in directions 58 and 60 along the central axis 18, the port 52 aligns or misaligns with the openings 54 and 56 in the inlet seat 30 and the outlet seat 32, which enables or blocks the flow of the fluid through the valve body 53 of the gate valve 10. It should be appreciated that the gate valve 10 may be bi-directional, and the terms "inlet" and "outlet" are used for ease of reference and do not describe any specific directional limitation of the gate valve 10. For example, the seats 30, 32 may be either inlet or outlet seats, respectively.

As described above, the gate valve 10 includes the actuator assembly 12, which opens and closes the gate valve 10 by moving the flow control element 16. The actuator assembly 12 may include the stem 14, hand wheel 62 (e.g., manual actuator), and bearing assembly 64. In some embodiments, the actuator assembly 12 may include a powered drive system, such as a hydraulic or electric drive system, for automatic actuation. As illustrated, the stem 14 extends through an aperture 66 in a bonnet 68. This enables the stem 14 to couple to the hand wheel 62 (e.g., actuator) and to the flow control element 16. More specifically, the hand wheel 62 couples to a first threaded end portion 70 of the stem 14 with a nut 72, while a second threaded end portion 74 threadingly couples to the flow control element 16. In operation, an operator opens and closes the gate valve 10 by rotating the hand wheel 62 (e.g., manual actuator) or engaging a powered drive system to thread the second threaded end portion 74 in and out of the flow control element 16. For example, as the stem 14 threads into the flow control element 16, the gate valve 10 opens as the first flow control element 16 moves in axial direction 60. Similarly, when the stem 14 threads out of the flow control element 16, the gate valve 10 closes as the flow control element 16 moves in axial direction 58. The bearing assembly 64 facilitates rotation of the stem 14 by surrounding and aligning the stem 14 in the passageway 66. In some embodiments, the bearing assembly 64 rests within a counterbore 76 and surrounds a flange 78 on the stem 14. The gate valve 10 retains the bearing assembly 64 and stem 14 within the bonnet 68 with a threaded nut 80 that threads into the counterbore 76.

Figure 3:
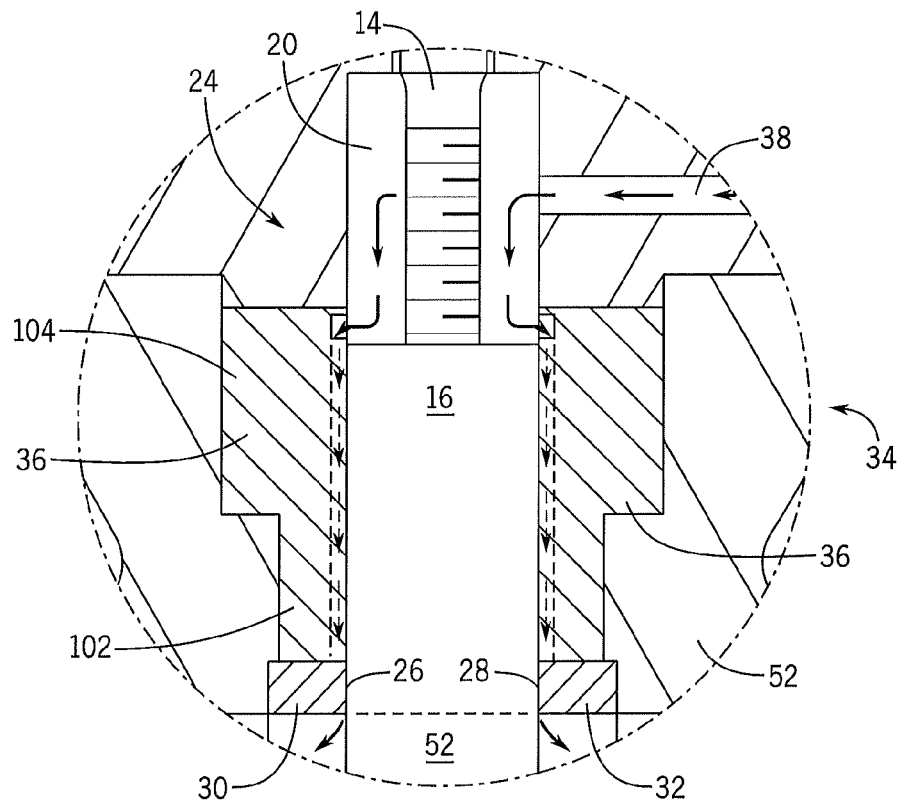
FIG. 3 is a partial cross-sectional side view of an embodiment of a gate valve with a valve insert system within line 3-3 of FIG. 2.

FIG. 3 is a partial cross-sectional side view of the gate valve 10 with the valve insert system 34 within line 3-3 of FIG. 2. As explained above, valve insert system 34 reduces wear on the flow control element 16 by focusing lubricant flow to the interfaces 26 and 28. The valve insert system 34 may include one or more inserts 36 (e.g., 1, 2, 3, 4, or more) that rest within the interior volume 24. For example, one or more inserts 36 may rest within the first chambers 20 to focus and equalize lubricant flow into the interface 26 and 28, which blocks or reduces the movement of proppant into the interfaces 26, 28. The inserts 36 may also purge proppant that enters the interface 26, 28. As illustrated, the inserts 36 include one or more grooves 100 (e.g., 1, 2, 3, 4, 5, 6, 7, 8, 9, 10 or more) that guide and equalize lubricant flow to the interface 26, 28.

The valve insert system 34 may also reduce the amount of lubricant by taking up space within the interior volume 24, which may decrease the cost of valve maintenance (e.g., lubricant replacement between frac jobs). As illustrated, the valve inserts 36 substantially take up most of the space within the interior volume 24 that is unoccupied by the flow control element 16, stem 14, valve seat 30, and valve seat 32. Accordingly, less lubricant is needed to fill the first chamber 20, and less new lubricant is needed to replace old lubricant during valve maintenance. In some embodiments, the valve inserts 36 may include a first portion 102 that is parallel to or substantially parallel to the flow control element 16 and a second portion 104 that is perpendicular or substantially perpendicular to the first portion 102. However, the valve inserts 36 may have any number of portions that enable the valve insert system 36 to occupy space within the interior volume 24 (e.g., first and second chambers 20, 22).

Figure 4:
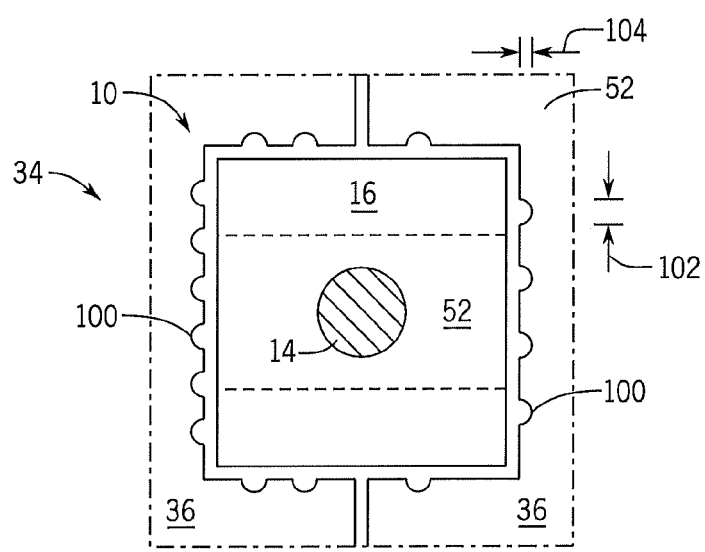
FIG. 4 is a top view of an embodiment of a gate valve with a valve insert system along line 4-4 of FIG. 2.

FIG. 4 is a top view of the gate valve 10 with the valve insert system 34 along line 4-4. As illustrated, the valve insert system 34 may include multiple inserts 36 that surround the flow control element 16. In some embodiments, there may be only a single insert 36 that surrounds the entire flow control element 16. As explained above, the valve inserts 36 may include multiple grooves 100 (e.g., 1, 2, 3, 4, 5, 6, 7, 8, 9, 10, or more). These grooves 100 guide and equalize lubricant flow into the interfaces 26, 28 between the flow control element 16 and the valve seats 30, 32. As illustrated, the grooves 100 have a semi-circular cross-section but other embodiments may include different cross-sections (e.g., parabolic, oval, square, rectangular, or a combination therefore). In some embodiments, the width 102 and depth 104 of the grooves 100 may differ with respect to each other. Furthermore, different valve inserts 36 may include different distributions of grooves 100. For example, one valve insert 36 may include fewer grooves 100 because it may be nearer to one of the lubrication ports (e.g., lubrication port 38). Accordingly, valve inserts 36 closer to a lubrication port (e.g., lubrication port 38) may have fewer grooves or smaller grooves to enable more equal distribution of the lubricant into the grooves 100 of the valve insert 36 further away from a lubrication port (e.g., lubrication port 38). Accordingly, valve inserts 36 may facilitate uniform lubricant flow into the interfaces 26, 28. In other embodiments, the grooves 100 may be concentrated to focus lubricant into specific locations, such as high wear locations, high heat locations, high stress locations, etc.

Figure 5:
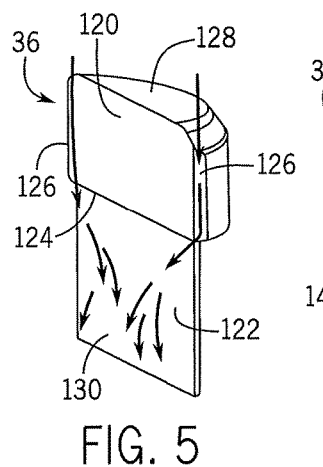
FIG. 5 is a perspective view of an embodiment of a valve insert according to an embodiment.

FIG. 5 is a perspective view of an embodiment of a valve insert 36. The valve insert 36 may include a first portion 120 (e.g., semi-circular or truncated cylindrical portion) and a second portion 122 (e.g., plate or planar portion). As illustrated, the first portion 120 may extend over the second portion 122 forming a lip 124. The first portion 120 may also include one or more grooves 126 that channel lubricant from a top surface 128 past the first portion 120 to the second portion 122. Once the lubricant passes the first portion 120, the second portion 122 guides the lubricant along the face 130 to the interfaces 26, 28.

Figure 6:
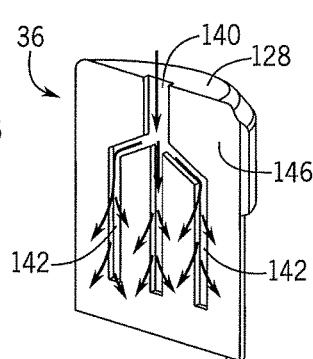
FIG. 6 is a perspective view of an embodiment of a valve insert according to an embodiment.
Figure 7:
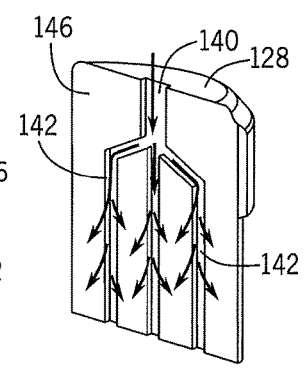
FIG. 7 is a perspective view of an embodiment of a valve insert according to an embodiment.
Figure 8:
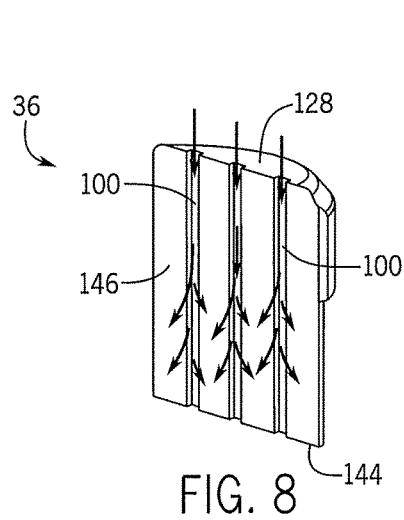
FIG. 8 is a perspective view of an embodiment of a valve insert according to an embodiment.
Figure 9:
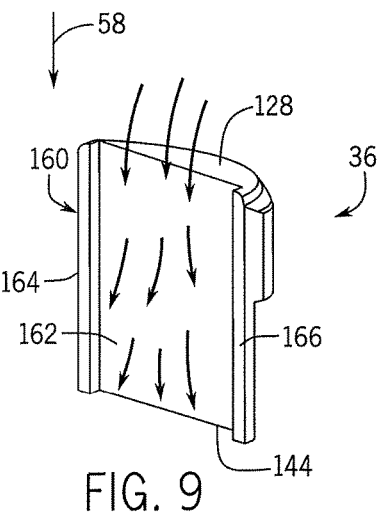
FIG. 9 is a perspective view of an embodiment of a valve insert according to an embodiment.

FIG. 6 is a perspective view of an embodiment of a valve insert 36 that includes a primary groove 140 that fluidly connects to multiple secondary grooves 142 (e.g., 1, 2, 3, 4, 5, or more). As illustrated, the primary and secondary grooves 140, 142 do not extend from the top surface 128 to the bottom surface 144. Accordingly, as lubricant flows into the secondary grooves 142, the secondary grooves 142 force the lubricant to spread across the face 146 of the valve insert 36. In some embodiments, the secondary grooves 142 may be evenly spaced from each other to equalize the spread of lubricant across the face 146. In other embodiments, the secondary grooves 142 may be unevenly spaced to increase lubrication at specific points. FIG. 7 is a perspective view of an embodiment of a valve insert 36 with a primary groove 140 that connects to multiple secondary grooves 142. However, in FIG. 7 the primary and secondary grooves 142 extend from the top surface 128 to the bottom surface 144. Depending on the embodiment, the secondary grooves 142 may be evenly or unevenly spaced. Accordingly, the secondary grooves 142 may focus lubrication at specific points of the interface 26 and/or 28. FIG. 8 is a perspective view of an embodiment of a valve insert 36 with grooves 100 extending from the top surface 128 to the bottom surface 144. Similar to FIGS. 6 and 7, the grooves 100 may be equally spaced or unequally spaced apart. FIG. 9 is a perspective view of an embodiment of a valve insert 36 with a single slot 160. The slot 160 enables a continuous even flow of lubrication to enter either interface 26 and/or 28. In some embodiments, the slot 160 may have a contoured face 162 that changes from a first side 164 to a second side 166 and from the top surface 128 to the bottom surface 144.

FIG. 10 is a side view of an embodiment of a valve insert 36 with a coating 180 that resists corrosion, facilitates lubricant flow, resists lubricant flow, etc. In some embodiments, the valve insert 36 may have multiple coatings at different locations to help enable the valve insert 36 to equalize the flow of lubricant. For example, some portions of the valve insert 36 may have coatings (e.g., low friction and/or smooth surface) that facilitate the flow of lubricant while other portions have coatings or a surface texture (e.g., high friction and/or rough surface texture) that resists the flow of lubricant. Coatings that facilitate lubricant flow may include polytetrafluoroethylene, PEEK, a polymer compound, or a ceramic compound, to name a few.

FIG. 11 is a side view of an embodiment of a valve insert 36. The valve insert 36 may include a base portion 190 and a removable cover portion 192. As illustrated, the removable cover portion 192 may include the groove or grooves 100. The removable cover portion 192 may be attached to the base portion 190 using connection joints, such as T-slots, pins, lift nuts, bolts, clamps, welds, and so forth. The ability to remove the portion 192 enables an operator to customize the valve insert 36 based on the type of lubricant, desired flow rates of lubricant, wear between the valve insert 36 and the flow control insert 16, etc.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. A system, comprising:
a valve, comprising:
a valve body having an interior volume and a bore along a first axis;
a first valve seat disposed about the bore;
a stem extending along a second axis; and
a flow control element coupled to the stem, wherein the stem is configured to selectively move the flow control element along a path of travel through the interior volume between a closed position and an open position relative to the bore, and a first surface of the flow control element faces the first valve seat along the path of travel; and
a valve insert system configured to reduce a size of the interior volume wherein the valve insert system comprises a first insert disposed between the valve body and the flow control element in the interior volume in a first stationary position relative to the valve body, and at least one groove extending along a first interface between the flow control element and the first insert and configured to guide a lubricant in a first flow direction along the flow control element to the first surface or the first valve seat to reduce wear on the flow control element.

2. The system of claim 1, comprising a frac system having the valve.

3. The system of claim 1, wherein the interior volume comprises a first chamber and a second chamber.

4. The system of claim 3, wherein the valve body comprises a first lubricant passageway in fluid communication with the first chamber and a second lubricant passageway in fluid communication with the second chamber.

5. The system of claim 3, wherein the first insert is disposed within the first chamber in the first stationary position relative to the valve body, wherein the first insert reduces a volume of the first chamber, and the first insert comprises the at least one groove.

6. The system of claim 5, wherein the valve insert system comprises a second insert disposed within the second chamber in a second stationary position relative to the valve body, wherein the second insert reduces a volume of the second chamber.

7. The system of claim 6, wherein the second insert comprises at least one groove extending along a second interface between the flow control element and the second insert and configured to guide the lubricant in a second flow direction along the flow control element to at least one of the first surface, the first valve seat, a second valve seat, or a second surface of the flow control element that faces the second valve seat along the path of travel.

8. The system of claim 7, wherein the at least one groove extends lengthwise along a side of the second insert such that the at least one groove is open along a corresponding side of the flow control element.

9. The system of claim 1, wherein the at least one groove comprises a plurality of grooves configured to guide the lubricant in the first flow direction along the flow control element to the first surface or the first valve seat.

10. The system of claim 1, wherein the at least one groove extends lengthwise along a side of the first insert such that the at least one groove is open along a corresponding side of the flow control element.

11. A system, comprising:
a valve insert system configured to mount within a valve having a flow control element that selectively moves between open and closed positions relative to a bore through a valve body of the valve, wherein the valve insert system comprises:
a first valve insert configured to mount between the valve body and the flow control element within a first chamber of the valve in a first stationary position relative to the valve body, wherein the first valve insert is configured to reduce a first volume of the first chamber, wherein the first valve insert comprises a first groove configured to guide a lubricant through the first chamber in a first flow direction extending along the flow control element and the first valve insert to a first area; and
a second valve insert configured to mount between the valve body and the flow control element within a second chamber of the valve in a second stationary position relative to the valve body, wherein the second valve insert is configured to reduce a second volume of the second chamber, wherein the second valve insert comprises a second groove configured to guide the lubricant through the second chamber in a second flow direction extending along the flow control element and the second valve insert to a second area, wherein the first and second areas are configured to be adjacent at least one valve seat about the bore or at least one surface of the flow control element that faces the at least one valve seat.

12. The system of claim 11, wherein the first groove extends from a first axial end to a second axial end of the first valve insert.

13. The system of claim 11, wherein the second groove extends from a first axial end to a second axial end of second valve insert.

14. The system of claim 11, wherein the first groove comprises a primary groove that fluidly connects to a plurality of secondary grooves.

15. The system of claim 11, wherein the first valve insert comprises a coating configured to facilitate the flow of the lubricant.

16. The system of claim 11, wherein the first valve insert comprises a first flat surface having the first groove extending lengthwise along the first flat surface, and the second valve insert comprises a second flat surface having the second groove extending lengthwise along the second flat surface.

17. The system of claim 11, wherein the first and second areas are configured to be adjacent the at least one valve seat and the at least one surface, the valve comprises a gate valve, and the flow control element comprises a gate of the gate valve.

18. A system, comprising:
a frac system configured to flow a proppant laden fluid, comprising:
a valve, comprising:
a valve body having an interior volume and a bore along a first axis;
a first valve seat disposed about the bore;
a stem extending along a second axis; and
a flow control element coupled to the stem, wherein the stem is configured to selectively move the flow control element through the interior volume along a path of travel between a closed position and an open position relative to the bore, and a first surface of the flow control element faces the first valve seat along the path of travel; and
a valve insert system configured to reduce a size of the interior volume, wherein the valve insert system comprises a first insert disposed between the valve body and the flow control element in the interior volume in a first stationary position relative to the valve body, and at least one groove configured to guide a lubricant in a first flow direction along the flow control element and the first insert to the first surface or the first valve seat to reduce wear on the flow control element from the proppant laden fluid.

19. The system of claim 18, wherein the interior volume comprises a first chamber and a second chamber, and wherein the valve insert system comprises the first insert disposed within the first chamber in the first stationary position relative to the valve body and configured to reduce a first volume of the first chamber, and a second insert disposed between the valve body and the flow control element within the second chamber in a second stationary position relative to the valve body and configured to reduce a second volume of the second chamber.

20. The system of claim 19, wherein the first insert comprises the at least one groove, and the second insert comprises at least one additional groove configured to guide lubricant in a second flow direction along the flow control element and the second insert to at least one of the first surface, the first valve seat, a second valve seat, or a second surface of the flow control element that faces the second valve seat along the path of travel.

\* \* \* \* \*